United States Patent
Amato et al.

(10) Patent No.: US 9,138,752 B2
(45) Date of Patent: Sep. 22, 2015

(54) DISSOLVED GAS FLOTATION PRESSURE REDUCTION NOZZLE

(75) Inventors: Tony Amato, Bridgnorth (GB); David Michael Brown, Stourbridge (GB); Jeremy Phillip Ferguson, Kidderminster (GB); Neil Valentine, Franche (GB)

(73) Assignee: Doosan Enpure Limited, Birmingham (GB)

( * ) Notice: Subject to any disclaimer, the term of this patent is extended or adjusted under 35 U.S.C. 154(b) by 715 days.

(21) Appl. No.: 13/500,548

(22) PCT Filed: Oct. 7, 2010

(86) PCT No.: PCT/EP2010/064994
§ 371 (c)(1),
(2), (4) Date: Apr. 5, 2012

(87) PCT Pub. No.: WO2011/042494
PCT Pub. Date: Apr. 14, 2011

(65) Prior Publication Data
US 2012/0193294 A1    Aug. 2, 2012

(30) Foreign Application Priority Data
Oct. 9, 2009   (GB) .................................. 0917642.1

(51) Int. Cl.
| | |
|---|---|
| C02F 1/24 | (2006.01) |
| B03D 1/24 | (2006.01) |
| B01F 3/04 | (2006.01) |
| B03D 1/14 | (2006.01) |
| C02F 1/52 | (2006.01) |
| C02F 103/08 | (2006.01) |

(52) U.S. Cl.
CPC .............. *B03D 1/24* (2013.01); *B01F 3/04524* (2013.01); *B03D 1/1412* (2013.01); *B03D 1/1431* (2013.01); *C02F 1/24* (2013.01); *C02F 1/5236* (2013.01); *C02F 2103/08* (2013.01)

(58) Field of Classification Search
USPC ................................................ 210/703, 221.2
See application file for complete search history.

(56) References Cited

U.S. PATENT DOCUMENTS

| | | | |
|---|---|---|---|
| 4,162,971 A | | 7/1979 | Klaus et al. |
| 6,811,705 B2 * | | 11/2004 | Puetter et al. ................. 210/703 |

FOREIGN PATENT DOCUMENTS

| | | | |
|---|---|---|---|
| DE | 3733583 A1 * | 4/1989 | |
| GB | 1444027 A | 7/1976 | |
| GB | 2268089 A | 1/1994 | |

OTHER PUBLICATIONS

Pelekr et al., "Application of flotation as a pretreatment process during desalination," Desalination, Elsevier, vol. 222, No. 1-3, Jan. 19, 2008, pp. 1-8.

(Continued)

*Primary Examiner* — Thomas M Lithgow
(74) *Attorney, Agent, or Firm* — Pepper Hamilton LLP (57) ABSTRACT

A dissolved gas flotation pressure reduction nozzle (60) comprises: an integrally molded plastics component (61) comprising a discharge spout (62), an impingement plate (64) and one or more fins (66) extending from the impingement plate (64) in the radially outwards and downstream directions; and a control plate (75) upstream of the impingement plate (64).

17 Claims, 6 Drawing Sheets

SECTION A-A (56) References Cited

OTHER PUBLICATIONS

International Search Report dated Jan. 7, 2011.

Rykaart et al., "Behaviour of Air Injection Nozzles in Dissolved Air Flotation," Wat. Sci. Tech. vol. 31, No. 3-4, pp. 25-35, 1995, Great Britain.

* cited by examiner

SECTION A-A

Fig. 6 though the orifices (not shown) into the pipe 49 of the control plate 46. The control plate 46 controls the water flow rate via the number and size of orifices.

The water then contacts the impingement plate 54. This provides a contact surface for water exiting from the control plate to assist with micro-bubble formation, and also assists in reduction of velocity/momentum of the water/gas mixture. The water with entrained micro-bubbles exits the pressure reduction nozzle 40 via the discharge spout 44.

DISSOLVED GAS FLOTATION PRESSURE REDUCTION NOZZLE

This application is a national phase filing under 35 U.S.C. §371 of international patent application number PCT/EP2010/064994 filed Oct. 7, 2010, which claims priority to GB 0917642.1 filed Oct. 9, 2009, each of which is hereby incorporated by reference in its entirety.

The present invention relates to a dissolved gas flotation pressure reduction nozzle, to a component of the nozzle, to an assembly/apparatus including the nozzle, to a method of manufacturing the nozzle and to methods of use of the nozzle.

Dissolved gas flotation (also referred to as DAF, an abbreviation for "dissolved air flotation") is a water treatment process. In DAF, water is clarified by the removal of suspended matter such as oil or solids. DAF is widely used in treating the industrial wastewater effluents from oil refineries, petrochemical and chemical plants, natural gas processing plants and similar industrial facilities. A very similar process known as induced gas flotation is also used for wastewater treatment. Froth flotation is commonly used in the processing of mineral ores.

Figure 1:
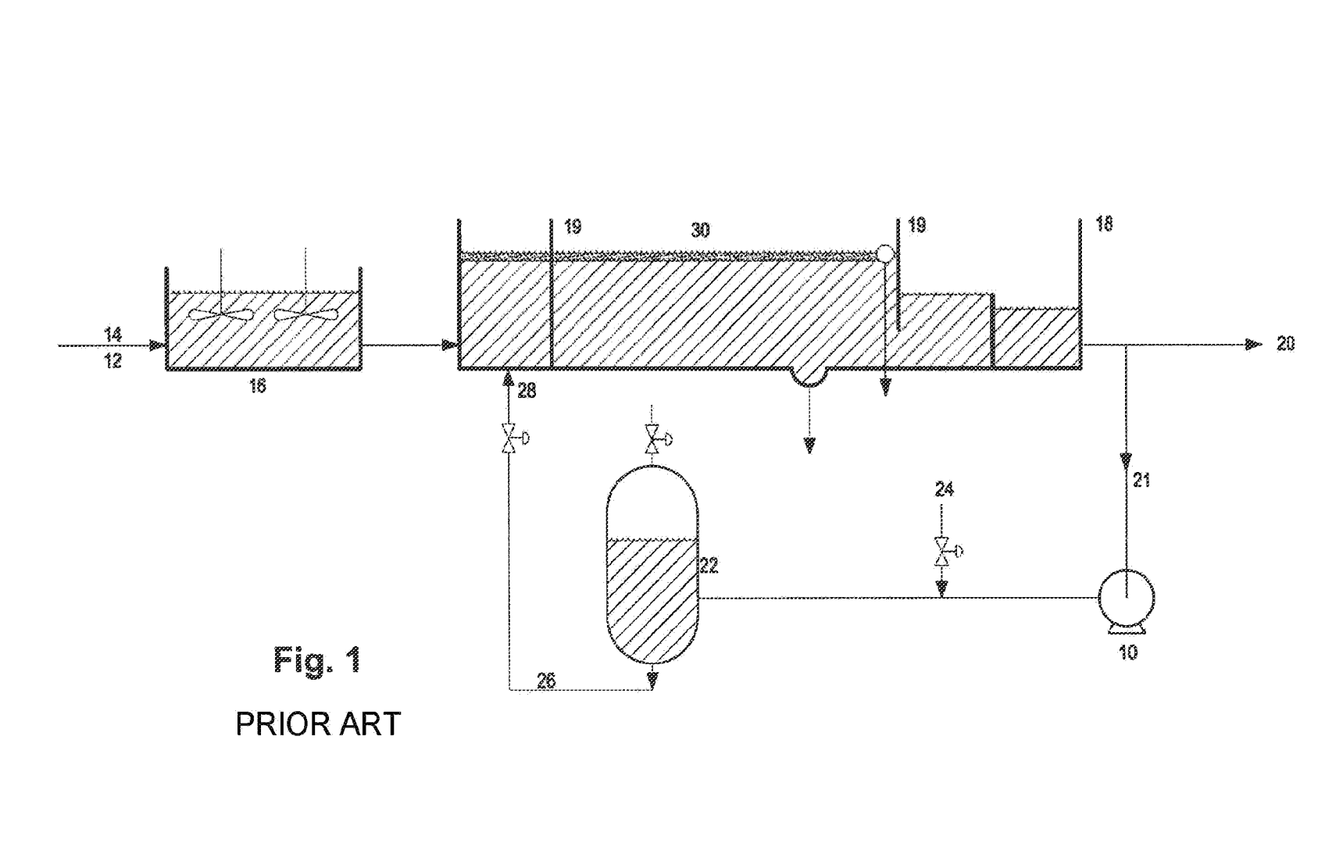
FIG. 1 is a schematic diagram of a known DAF apparatus.

A typical DAF apparatus 10 is shown in FIG. 1. Feed water 12 is introduced to the apparatus, where it may be dosed with a coagulant 14 (e.g. ferric chloride or aluminium sulfate) via an inline mixer or a flash mixer comprising a single mixer and small tank (not shown). The water is passed to a chemical mix tank 16 to flocculate the suspended matter and then to a flotation tank 18 (of depth typically at least 1.5 m) at atmospheric pressure. The flotation tank 18 includes baffles 19. Effluent water 20 is withdrawn from the flotation tank 18. A portion of the effluent water 20 leaving the flotation tank 18 is recycled. The recycled water 21 is pumped into a saturator vessel (small pressure vessel) 22 into which gas e.g. compressed air 24 is also introduced so that the water is saturated with gas. The gas-saturated water stream 26 is passed through a pressure reduction nozzle 28 into the flotation tank 18. On passing through the pressure reduction nozzle 28, the gas is released from solution in the form of micro-bubbles which adhere to the suspended matter. The micro-bubbles rise to the surface of the water, carrying the suspended matter with them. The suspended matter forms a froth 30 which may then be removed using a skimming device.

Figure 2:
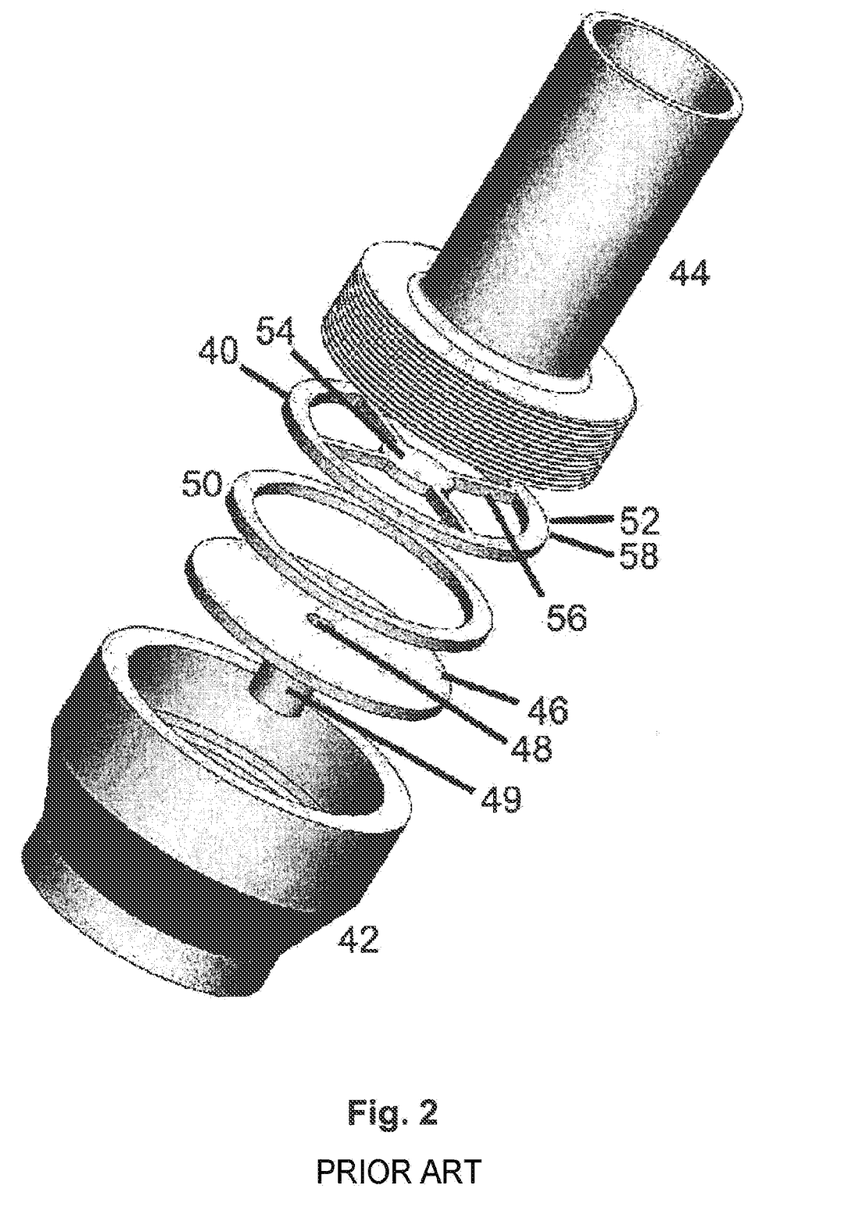
FIG. 2 is an exploded perspective view of a known DAF pressure reduction nozzle.

A DAF nozzle pressure reduction nozzle 40 currently manufactured by the applicant is shown in FIG. 2. The nozzle comprises a socket 42 with an internal screw thread (not shown), the socket 42 being formed of stainless steel. A discharge spout 44 formed of acrylonitrile butadiene styrene (ABS) plastics is screwed into the socket 42. Between the socket 42 and discharge spout 44 are clamped (in order from the socket 42 to the discharge spout 44) a stainless steel control plate 46, a stainless steel spacer ring 50 and a stainless steel impingement plate component 52 having the form of a circular central impingement plate 54 connected via four equally radially spaced arms 56 to an outer ring 58. The stainless steel control plate 46 has a short central pipe 49 extending towards the socket 42. The pipe 49 is open at the control plate end 48 and sealed at the socket end (not shown). The pipe 49 has 1 to 4 cut or drilled orifices (not shown), typically spaced at 90° angles to one another at a short distance from the socket end.

In use, the pressure reduction nozzle 40 occupies the position 28 shown in FIG. 1.

The gas saturated water stream 26 passes through the pressure reduction nozzle 40 as explained above. A reduction in pressure occurs as the water passes from the socket 42 through the orifices (not shown) into the pipe 49 of the control plate 46. The control plate 46 controls the water flow rate via the number and size of orifices.

The water then contacts the impingement plate 54. This provides a contact surface for water exiting from the control plate to assist with micro-bubble formation, and also assists in reduction of velocity/momentum of the water/gas mixture. The water with entrained micro-bubbles exits the pressure reduction nozzle 40 via the discharge spout 44.

In a first aspect, the present invention provides a dissolved gas flotation pressure reduction nozzle comprising:

an integrally moulded plastics component comprising a discharge spout, an impingement plate and one or more fins extending from the impingement plate in the radially outwards and downstream directions; and a control plate upstream of the impingement plate.

Preferably, the dissolved gas is air. However, other gases may be used. For example, natural gas (essentially methane) may be used in the oil industry as the absence of oxygen helps to minimise explosion risk.

It is preferred that all components of the nozzle be acceptable for use with waters intended for potable supply. However, in practice DAF-treated water (e.g. sea water) may require further treatment (e.g. via a membrane process) to produce potable water. Where this is the case, it is not necessary for the components of the nozzle to be acceptable for use with waters intended for potable supply.

Preferably, at least one fin or a part thereof lying radially outwards of the impingement plate has non-parallel faces diverging in the upstream to downstream direction. These faces may be planar or curved. If curved, the faces are preferably concave.

The non-parallel faces may comprise one face substantially parallel to the discharge spout axis and one face at an angle to the discharge spout axis, or two faces each at an angle to the discharge spout axis. Preferably in either case, the angle(s) is/are in the range of 0.5° to 90°.

Where only a part of the fin(s) lying radially outwards of the impingement plate has non-parallel faces diverging in the upstream to downstream direction, the/each fin may further comprise an inner portion which has non-parallel faces converging in the upstream to downstream direction. Such non-parallel faces preferably comprises two faces each at an angle to the discharge spout axis, but may comprise one face substantially parallel to the discharge spout axis and one face at an angle to the discharge spout axis. Preferably in either case, the angle(s) is/are in the range of 0.5° to 90°.

Suitably, the fins are identical. Suitably, there are four fins. In a preferred embodiment, the nozzle comprises four identical fins equally radially spaced (i.e. at 90° spacing).

In one preferred embodiment, the nozzle further comprises a baffle positioned in the discharge spout downstream of the one or more fins. The baffle preferably forms part of the integrally moulded plastics component, and suitably extends from at least one fin (e.g. from two opposing fins) in the downstream direction. Preferably, the baffle has non-parallel faces converging in the upstream to downstream direction. Preferably the baffle faces are each at an angle in the range of 0.5 to 90° to the discharge spout axis.

Preferably, the integrally moulded plastics component further comprises a connector portion for connection to a socket. Suitably, the connector portion is provided with a screw thread (preferably with an external screw thread).

Preferably, the discharge spout comprises grips. The grips may be a moulded feature of the integrally moulded plastics component, for example in the form of raised ribs.

Preferably, the plastics of the integrally moulded plastics component is a thermoplastic. More preferably, the plastics is acrylonitrile butadiene styrene (ABS), as this material is approved for use in the drinking water industry. A wide variety of other plastics could be used, however, including unplasticised PVC (uPVC), high density polyethylene (HDPE), polypropylene and acetal resin.

Preferably, the control plate is formed of stainless steel or of plastics. Where the control plate is of plastics, it is preferably selected from the preferred plastics for the integrally moulded plastics component set out above.

In a second aspect, the invention relates to an integrally moulded plastics component as described above.

In a third aspect, the invention relates to an assembly comprising a nozzle as described above and a socket. The socket is preferably formed from plastics or a composite material. Where the socket is of plastics, it is preferably selected from the preferred plastics for the integrally moulded plastics component set out above.

In a fourth aspect, the invention relates to a dissolved gas flotation apparatus comprising at least one assembly as described above.

Preferably, at least one nozzle is arranged such that the axis of the discharge spout is within 90° of vertical (upwards). More preferably, at least one nozzle is arranged such that the axis of the discharge spout is within 15° of vertical. In a preferred embodiment, at least one nozzle (preferably all nozzles) is vertical.

In a fifth aspect, the invention relates to a method of manufacturing a nozzle as described above, wherein the plastics component is moulded.

Preferably, the plastics component is moulded using two internal tooling elements which operate together to form the impingement plate and to form the fins (and the baffle if included in the plastics component).

Preferably, the control plate is placed in position after moulding and before cooling of the plastics component and is held in place by the plastics component after cooling.

In a sixth aspect, the invention relates to a dissolved gas flotation process using an apparatus as described above.

Preferably, the process is carried out on salt water, for example on sea water.

In a seventh aspect, the invention relates to a salt water desalination process comprising an initial dissolved gas flotation process as described above.

In further aspects, the invention relates to a dissolved gas flotation pressure reduction nozzle, a component, an assembly, an apparatus, a method or a process substantially as herein described with reference to the description and/or drawings.

The invention will be further described with reference to two preferred embodiments and to the drawings, in which.

Figure 3:
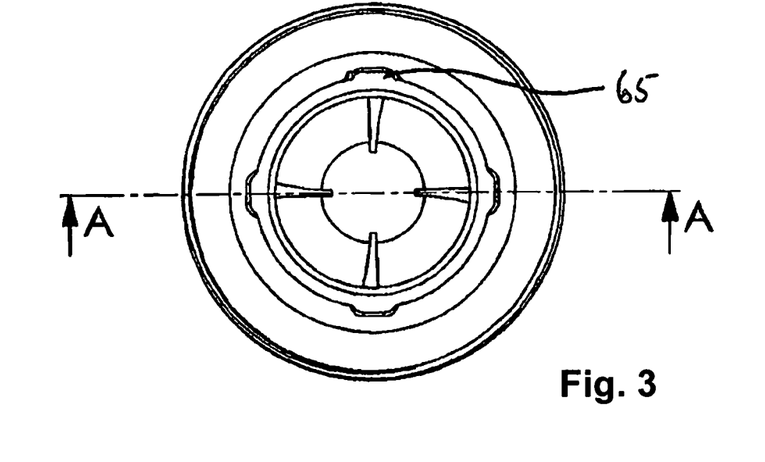
FIG. 3 shows a DAF pressure reduction nozzle according to a first preferred embodiment of the invention in two sectional views.

In the first preferred embodiment of the invention, a DAF pressure reduction nozzle 60 comprises a component 61 integrally moulded from ABS plastics. The component 61 includes a discharge spout 62, a connector portion 63 (for connection to a socket (not shown)), an impingement plate 64 and four profiled fins 66.

The discharge spout 62 has the form of a cylindrical tube. The discharge spout 62 has four integrally moulded raised ribs 65 on its outer surface to serve as grips when installing the nozzle 60. The ribs extend parallel to the axis 72 of the discharge spout 62 and are at 90° intervals.

The connector portion 63 has the general form of a wider cylindrical tube at the upstream end of the discharge spout 62. The connector portion 63 has a recess portion 76 with a shoulder 73 at its mouth and an external screw thread 68.

The impingement plate 64 has the form of a circular plate positioned centrally within the connector portion 63.

Figure 4:
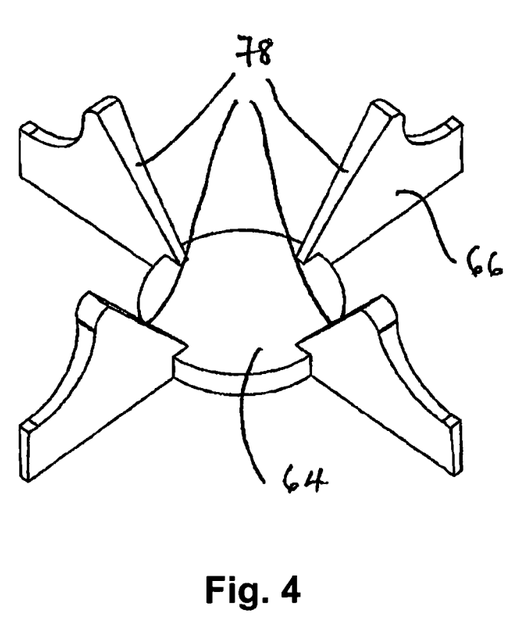
FIG. 4 shows the impingement plate and profiled fins of the DAF pressure reduction nozzle of FIG. 3 in a perspective view from above.
Figure 5:
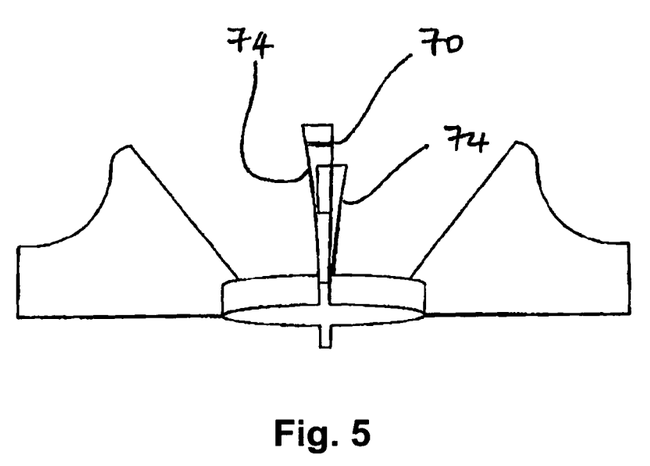
FIG. 5 shows the impingement plate and profiled fins of the DAF pressure reduction nozzle of FIG. 3 in a perspective view from below.

The profiled fins 66 are shown in more detail in FIGS. 4 and 5. The four profiled fins 66 extend radially at 90° intervals and in the downstream direction from the impingement plate 64. The profiled fins 66 connect the impingement plate 64 to the connector portion 63. Each fin 66 is generally wedge-shaped, having one face 70 parallel to the axis 72 of the discharge spout 62 and one face 74 angled to this axis 72 at an angle of 0.5°, such that the fin 66 widens in the upstream to downstream direction. The fins 66 increase in height in the radially outwards direction.

The nozzle 60 further comprises a control plate 75. The control plate 75 is formed of a corrosion resistant and hard wearing stainless steel (e.g. austenic stainless steel for use with surface waters or duplex grade stainless steel for use with seawater). However, the control plate could also be formed of a composite plastics material. The control plate 75 has a pipe 77 with orifices 79 as described for control plate 46 above.

To form the nozzle 60, component 61 is moulded. This is done using two internal tooling elements (not shown). Referring to the orientation of the DAF nozzle shown in section A-A in FIG. 3, the first tooling element extends from above and forms the inside of the discharge spout 62, the inward faces 78 of the profiled fins 66 and the upper surface of the impingement plate 64. The second tooling element extends from below and forms the inside of the connector portion 63 (including the recess 76), the profiled fins 66 (other than their inward faces 78) and the impingement plate (other than its upper surface).

Molten plastics is injected into the assembled mould under high pressure. Temperatures in the range of 200-250° C. are typically used for ABS or polyolefin, with higher temperatures being used for some more specialised grades of plastics.

After the component 61 is formed, the first tooling element is withdrawn in the upwards direction and the second tooling element in the downwards direction. The profiling of the profiled fins 66, which narrow in the downwards direction, assists with removal of the second tooling element.

On opening the mould, the component 61 is ejected automatically. A machine operator retrieves the component 61 from the moving side of the tool, or from a catcher device, and immediately inserts the control plate 75 into the recess 76 in the mouth of the connector portion 63.

The nozzle 60 is stacked in such a way that the control plate 75 is supported by the shoulder 73 of the connector portion 63 and allowed to cool to room temperature. Post-mould shrinkage takes effect, gripping the control plate 75 and securing it in place.

The nozzle 60 is installed by screwing the screw thread 68 of the connector portion 63 into a socket (not shown, similar to socket 42 in FIG. 2) having an internal screw thread. The socket is made of plastics or composite material.

Typically DAF pressure reduction nozzles 28, 40, 60 are installed with the axis of the discharge spout vertical so that the general direction of water flow from upstream to downstream is vertically upwards. However, when installing the nozzle 60 the axis 72 of the discharge spout 62 may be angled at from 0° to 90° (e.g. about 15°) to the vertical. Where the axis 72 is below the horizontal plane, undesirable large bubbles are likely to result. The axis 72 may be parallel or non-parallel to the incline baffle 19 immediately downstream.

The nozzle 60 is used in the same way as a conventional DAF nozzle (described above in connection with FIG. 1).

The first preferred embodiment of the invention has various advantages:
- the angled faces of the profiled fins of the DAF nozzle of the invention deflect the water flow from the normal axial path. This leads to folding of the water flow, resulting in turbulence. This turbulence results in increased micro-bubble production, because bubble nuclei are readily formed, and more uniform bubble size (10-100 µm diameter), as large bubbles are destroyed under these harsh conditions. These factors make the DAF process more efficient.
- the materials used in the DAF nozzle of the invention are corrosion-resistant and can be used in the treatment of seawater. DAF treatment of seawater is of particular interest as a pre-treatment before desalination, for example desalination using membrane systems.
- the vertical grips on the spout assist with installation of the DAF nozzle.
- the DAF nozzle can be simply manufactured.

It has been found, however, that the nozzle of the first preferred embodiment can develop problems at high capacity. When water is passed through a normally-performing nozzle into air, the flow of discharged water collapses after a short distance and is white in appearance. By contrast, when water is passed through a problematic nozzle, the flow of discharged water is sprayed over a 360° range and is not white in appearance. The latter type of flow has not fully collapsed and contains few microbubbles. This could potentially contribute to poor water quality.

In order to address this problem, the inventors have developed the nozzle of the second preferred embodiment of the invention, which has different profiled fins 166 (FIG. 6) from the profiled fins 66 of the first embodiment of the invention.

Figure 6:
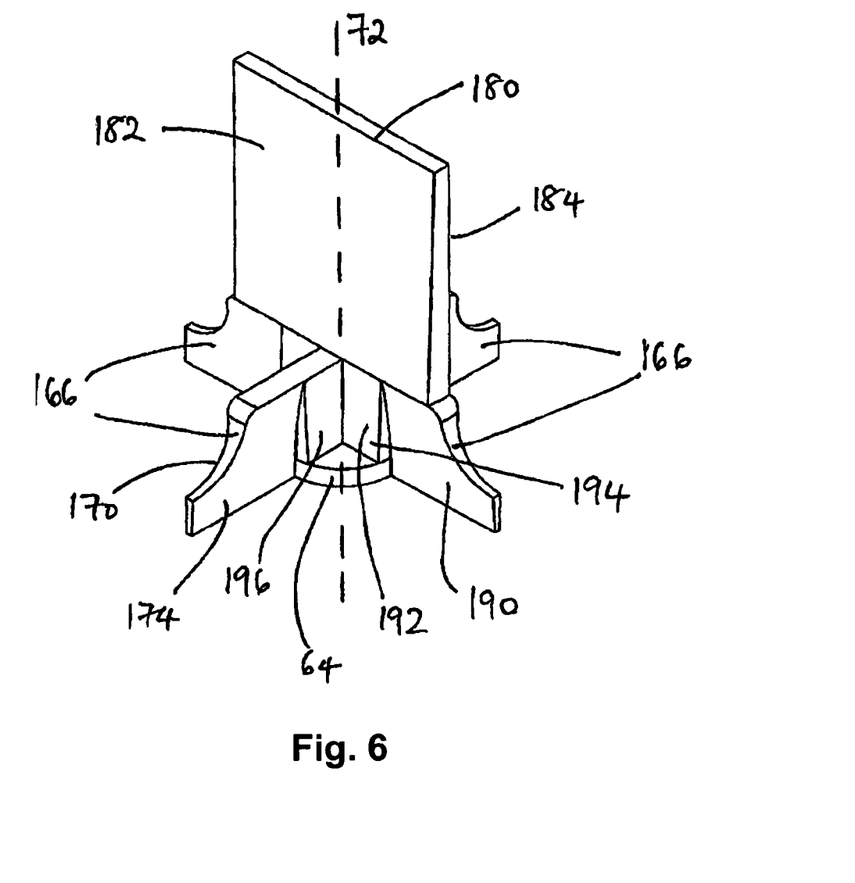
FIG. 6 shows the impingement plate, profiled fins and baffle of a DAF pressure reduction nozzle according to a second preferred embodiment of the invention in a perspective view from above.

The four profiled fins 166 differ from the profiled fins 66.

The fins 166 each have an outer portion 190 (lying outside the footprint of the impingement plate 64) and an inner portion 192 (lying within the footprint of the impingement plate 64).

Each outer portion 190 is similar in profile to a profiled fin 66 of the first preferred embodiment of the invention, except that it is of constant height rather than increasing in height in the radially outwards direction. In addition, each outer portion 190 has each of its faces 170, 174 angled at 0.5° to the axis 72 of the discharge spout 62 such that the outer portion 190 widens in the upstream to downstream direction.

Each inner portion 192 extends at the same height as the outer portion 190 radially inwards, so that the inner portions 192 meet at the centre of the impingement plate 64. Each inner portion 192 has each of its faces 194, 196 angled at 0.5° to the axis 72 of the discharge spout 62 such that the inner portion 192 narrows in the upstream to downstream direction.

The fins 166 are wider at their downstream ends than the fins 66 of the first preferred embodiment.

Furthermore, in the second embodiment of the preferred invention, a baffle 180 is provided. The baffle 180 extends from two opposing profiled fins 166 in the downstream direction. The baffle 180 is wedge-shaped, having the same thickness as the profiled fins 166 at its base and narrowing in the upstream to downstream direction. The baffle 180 has two angled faces, 182 and 184, both angled at 0.5° to the axis 72 of the discharge spout 62. The baffle 180 extends for approximately 50% of the length of the cylindrical tube part of the discharge spout 62. The baffle 180 does not extend the full length of the discharge spout 62 to ensure that the nozzle exit velocity does not exceed about 0.5 m/s.

The nozzle of the second preferred embodiment of the invention is manufactured in a similar way to that of the first preferred embodiment. The baffle 180 is formed by the first tooling element. The profiling of the baffle 180 and inner portions 192 of the profiled fins 166 assists with removal of the first tooling element. The profiling of the outer portions 190 of the profiled fins 166 assists with removal of the second tooling element.

Inclusion of the baffle 180 improves the problem of non-collapsed flow referred to above.

Although the invention has been described with reference to the illustrated preferred embodiments, it will be recognised that various modifications are possible within the scope of the invention.

What is claimed is:

1. A dissolved gas flotation pressure reduction nozzle (60) comprising:
    an integrally moulded plastics component (61) comprising a discharge spout (62), an impingement plate (64) and one or more fins (66) extending from the impingement plate (64) in the radially outwards and downstream directions; and
    a control plate (75) upstream of the impingement plate (64).

2. A nozzle (60) as claimed in claim 1, wherein at least one fin (66) or a part (190) thereof lying radially outwards of the impingement plate (64) has non-parallel faces (70, 74; 170, 174) diverging in the upstream to downstream direction.

3. A nozzle (60) as claimed in claim 1, wherein at least one fin (66) or a part (190) thereof lying radially outwards of the impingement plate (64) has one face (70) substantially parallel to the discharge spout axis (72) and one face (74) at an angle of 0.5° to 90° to the discharge spout axis (72), or has two faces (170, 174) each at an angle of 0.5° to 90° to the discharge spout axis (72).

4. A nozzle (60) as claimed in claim 1, further comprising a baffle (180) downstream of the one or more fins (166).

5. A nozzle (6) as claimed in claim 4, wherein the baffle (180) has non-parallel faces (182, 184) converging in the upstream to downstream direction.

6. A nozzle (60) as claimed in claim 1, wherein the integrally moulded plastics component (61) further comprises a connector portion (63) for connection to a socket.

7. A nozzle (60) as claimed in claim 1, wherein the discharge spout (62) comprises grips (65).

8. A nozzle (60) as claimed in claim 1, wherein the plastics is acrylonitrile butadiene styrene (ABS).

9. A nozzle (60) as claimed in claim 1, wherein the control plate (64) is formed of stainless steel or of plastics.

10. An assembly comprising a nozzle (60) as claimed in claim 1 and a socket.

11. A dissolved gas flotation apparatus comprising at least one assembly as claimed in claim 10.

12. A dissolved gas flotation apparatus as claimed in claim 11, wherein at least one nozzle (60) is arranged such that the axis of the discharge spout is within 15° of vertical.

13. A method of manufacturing a nozzle (60) as claimed in claim 1, wherein the integrally moulded plastics component (61) is moulded using two internal tooling elements which operate together to form the impingement plate (64) and to form the fins (66).

14. A method as claimed in claim 13, wherein the control plate (75) is placed in position after moulding and before cooling of the integrally moulded plastics component (61) and is held in place by the plastics component (61) after cooling.

15. A dissolved gas flotation process using an apparatus as claimed in claim 11.

16. A dissolved gas flotation process as claimed in claim 15, wherein the process is carried out on salt water.

17. A salt water desalination process comprising an initial dissolved gas flotation process as claimed in claim 16.

* * * * *